June 6, 1939.  J. MIHALYI  2,161,372

CAMERA ADJUSTING MECHANISM

Filed Nov. 5, 1937

Joseph Mihalyi
INVENTOR

BY
ATTORNEYS

Patented June 6, 1939

2,161,372

UNITED STATES PATENT OFFICE 2,161,372

CAMERA ADJUSTING MECHANISM

Joseph Mihalyi, Rochester, N. Y., assignor to Eastman Kodak Company, Rochester, N. Y., a corporation of New Jersey Application November 5, 1937, Serial No. 173,001

4 Claims. (Cl. 116—124)

This invention relates to photography and more particularly to dial construction for photographic cameras.

One object of my invention is to provide a camera with one or more adjusting dials which are so mounted on the camera body that they lie substantially flush with it and provide a smooth outside camera contour. Another object is to provide dials that are fully visible and can be readily operated. Another object of my invention is to provide a camera in which a dial, having a relatively large, roughened or knurled portion, is used to set camera mechanism. Another object of my invention is to provide a camera with the necessary adjusting dials which are set into the body of the camera without materially increasing the thickness of the camera walls. Still another object of my invention is to provide a dial construction which is attractive in appearance and which takes up but little room, and to provide a dial construction in which a relatively thin camera wall may be used to rotatably support an adjusting dial. Other objects will appear from the following specification, the novel features being particularly pointed out in the claims at the end thereof.

In modern cameras of the so-called miniature type where it is usually necessary to have a plurality of adjusting dials to set the various mechanical parts of the camera, such as the shutter, the automatic timing device, the retarded exposing device and other features, it is usually necessary to have a series of knobs which project more or less from the camera body for setting the various parts of the camera. Such knobs not only disfigure the camera, but are objectionable because they are in a position in which they may catch on the clothing of the user and they more or less obstruct the passage of the camera into a carrying case, and they tend to increase the overall dimensions of the camera on which they are used. Moreover, it is a comparatively simple matter to accidentally turn such knobs or handles by laying the camera down, and it is to eliminate all these undesirable features that I have designed the particular form of setting dial which is described and claimed herein.

Coming now to the drawings wherein like reference characters denote like parts throughout:

In accordance with a preferred embodiment of my invention, the dials are sunk down into the camera walls supporting the dials until the top surfaces are flush with the camera wall. The dials may be operated by a small, rounded, arcuate section which projects slightly from one wall of a camera, and since the dials are provided with a relatively large knurled area in proportion to the actual size of the dial, they can be readily operated when intentionally moved by an operator, and there is comparatively little chance of the dials being accidentally moved.

Figure 1:
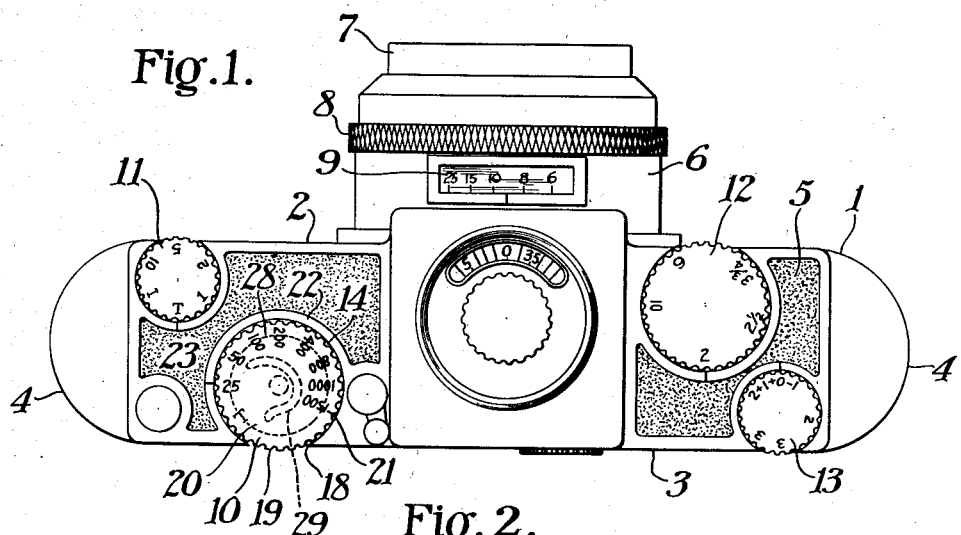
Fig. 1 is a top plan view of a camera constructed in accordance with and embodying a preferred form of my invention.

In accordance with the showing in the drawing, Fig. 1 represents a typical camera which may be of the type which takes pictures on 35 mm. perforated motion picture film. The camera body 1 is provided with a front wall 2, a rear wall 3, rounded end walls 4 and a top wall 5. On the front wall 2, there is a tubular housing 6 which encloses the objective, the front lens cell 7 of which is showing in the drawing. This objective may be focused by the knurled ring 8 and the focusing scale may appear through the window 9 on the top of the tubular member 6.

In the present embodiment of my invention, I prefer to utilize the top wall 5 to support a series of adjusting dials because when this is done, an operator, by looking down on the top of the camera, has all the necessary information before him and can see at a glance the settings of the various dials.

Accordingly, on the top wall 5, I provide a series of dials 10, 11, 12 and 13, each of which is mounted in a suitable seat in the top wall, as will be hereinafter fully described. Dial 10 is the dial which is set to set the shutter for the higher speeds from $\frac{1}{25}$ of a second to $\frac{1}{1500}$ of a second. Dial 11 is the dial used to set the shutter for the slow automatic speeds from $\frac{1}{10}$ of a second to one second. Dial 12 is the dial which is used to compensate the range finder for lenses of different focal lengths. Dial 13 is the dial which adjusts the focusing lens of the finder to accommodate the eye of the user to the optical system of the finder.

Since all these dials are alike, as far as their mounting on the camera wall goes, it is only necessary to fully describe one of them, and dial 10 will be used as an example.

Figure 2:
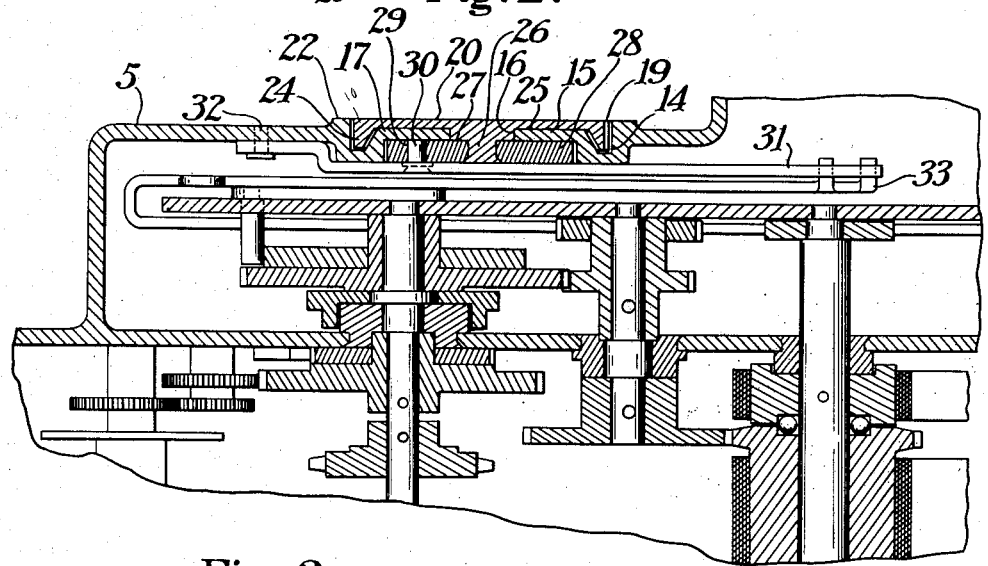
Fig. 2 is a fragmentary, enlarged sectional view taken on line 2—2 of Fig. 1 and showing, in cross-section, a preferred embodiment of a camera setting dial.

Referring to Fig. 2, it will be seen that the dial 10 lies substantially flush with the top wall 5 of the camera and that this is accomplished in the following manner: The wall 5 is provided with an annular or arcuate groove 14 which surrounds an annular or arcuate seat 15, which, in turn, surrounds a central opening or bearing 16 in the camera wall. The dial seat as well as the groove which will be referred to broadly as 17 may be considered arcuate in shape rather than annular because the center of the bearing 16 is so positioned that the seat 17, as clearly shown in Fig. 3, while chiefly formed in the top wall 5, breaks through the rear wall 3 of the camera as is indicated at 18, so that a knurled area 19 of the dial 10 will project a slight distance from the flat face of the wall 3 to enable an operator to turn the dial.

The dial itself is a disk of metal having a flat top 20 on which suitable graduations 21 may be engraved or otherwise marked. As above explained, this flat top is substantially flush with the top wall of the camera, although there may be, if desired, a raised decorative embossing 22 forming, on its inner side, an edge for the dial and, on its outer side, an edge for the leather covering 23.

Figure 3:
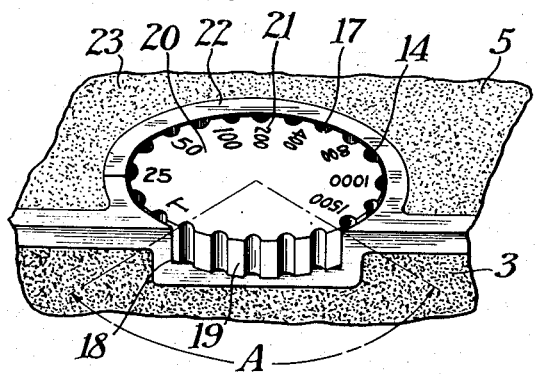
Fig. 3 is an enlarged perspective view of one of the dials shown in the preceding figures.

The flat disk 10 is provided with a downwardly extending flange 24 which is of considerable depth, this flange tapering upwardly to the bottom wall 25 of the disk which, as shown in Fig. 2, is only spaced from the top wall of the disk a very short distance. In other words, the dial is thin and light, and yet at the same time it is provided with a relatively wide surface for the knurling 19, so that after the dial has been assembled, it forms a substantial-looking structure, as shown in Fig. 3. I prefer to form the under side of the dial substantially complementary in shape to the shape of the seat, except, of course, that the dial is completely annular so that it will project out from the camera wall 3.

The dial has a downwardly extending annular shaft portion 26 which is revolubly supported by the bearing 16 and which is preferably provided with a shoulder 27 on which a member 28, such as a cam, may be attached. Thus, the member 28 not only fastens the dial revolubly in position in its seat, but it provides the means for adjusting the various parts of the shutter mechanism. For instance, in the cam 28 there is preferably cut a cam slot 29 which is adapted to receive a cam follower 30 carried by the arm 31, preferably mounted at 32 to the top casing wall 5, so that as the knurled portion 19 of the dial is turned, the location of this arm, which forms a stop for the shutter mechanism adjusting arm 33, as is fully described in my copending application Serial No. 212,269, filed June 7, 1938, is altered.

Each of the remaining dials, 11, 12 and 13, are all mounted in the camera wall 5 in the same way as is the dial 10. In other words, in each case, the top wall supports a dial seat which is substantially annular in shape, except that it breaks through an edge wall of the camera—the wall 2 in the case of the dials 11 and 12 and the wall 3 in the case of the dials 10 and 13. Thus, the dial is sunk substantially flush with one wall of a camera and projects a comparatively short distance over another wall of the camera which is arranged at an angle to the wall carrying the dial seat. As can be seen from Figs. 1 and 3, this dial construction has the material advantage that the only portion of the dial which projects from the camera body is the relatively small angular portion A, as indicated in Fig. 3. Even though this portion is small and it has a rounded outside contour, the flange bearing knurling 19 is relatively deep, and consequently, there is a substantial area by which the dial can be readily adjusted. Moreover, as will be seen from Fig. 2, the dial can be successfully mounted on a camera wall which is extremely thin, which is a very material advantage in reducing the over-all size and the weight of the camera.

What I claim and desire to secure by Letters Patent of the United States is:

1. In a camera including a built in shutter, the combination with a plurality of built in control dials, each of said dials comprising a disk, a roughened edge on the disk, an open seat enclosing said disk except for the top of the disk and for a small area of said roughened portion which is exposed for normal operation, whereby accidental operation thereof is minimized.

2. In a camera including a built in shutter, the combination with a plurality of built in control dials, each of said dials comprising a disk, a roughened edge on the disk, an open seat enclosing said disk except for the top of the disk and for a small area of said roughened portion which is exposed for normal operation, said control dials being so positioned on the camera body as to be operable by fingers of hands of an operator holding said camera in a picture taking position at eye level and to be fully visible from the camera top.

3. In a camera including a built in shutter, the combination with a plurality of built in control dials, each of said dials comprising a disk, a roughened edge on the disk, an open seat enclosing said disk except for the top of the disk and for a small area of said roughened portion which is exposed for normal operation, said camera including top, bottom and side walls, said dial seats being located in said top wall and the said roughened dial portions projecting from said seats over the side walls whereby the dials may be operated by the hands of an operator while holding the camera in position for exposure and the entire top of the dials being fully visible.

4. In a camera including walls arranged at right angles to each other, the combination with an open arcuate seat cut in one wall, an arcuate groove around the periphery of the arcuate seat, a dial including a knurled annular flange adapted to lie in said arcuate groove and fit said arcuate seat, said knurled annular flange projecting from the arcuate seat into an accessible position.

JOSEPH MIHALYI.